United States Patent [19]
Ishida

[11] Patent Number: 5,602,985
[45] Date of Patent: Feb. 11, 1997

[54] DATA PRESENTING DEVICE

[75] Inventor: Eiji Ishida, Kanagawa, Japan

[73] Assignee: Fuji Xerox Co., Ltd., Tokyo, Japan

[21] Appl. No.: 657,429

[22] Filed: Jun. 3, 1996

Related U.S. Application Data

[63] Continuation of Ser. No. 149,825, Nov. 10, 1993, abandoned.

[30] Foreign Application Priority Data

Nov. 13, 1992 [JP] Japan ................................ 4-327518

[51] Int. Cl.$^6$ .................................................. G06F 15/00
[52] U.S. Cl. ...................... 395/501; 395/326; 345/121; 345/123; 345/122
[58] Field of Search ................................ 395/162–166, 395/155, 161; 345/113, 114, 121, 122, 123, 127, 129, 130

[56] References Cited

U.S. PATENT DOCUMENTS

| | | | |
|---|---|---|---|
| 5,333,254 | 7/1994 | Robertson | 395/155 |
| 5,339,390 | 8/1994 | Robertson et al. | 395/157 |
| 5,408,655 | 4/1995 | Oren et al. | 395/600 |

OTHER PUBLICATIONS

D. Gedye & R. Katz, Browsing the Chip Design Database, 25th ACM/IEEE Design Automation Conference, 1988, pp. 269–274.

T. Oren, The CD–ROM Connection: Compact Dicks May Unlock Hypertext Potential, BYTE, vol. 13, No. 13, Dec. 1988, p. 315.

J. Fiderio, A Grand Vision: Hypertext Mimics the Brain's Ability to Access Information Quickly: Intuitively by References, BYTE, vol. 13, No. 10, Oct. 1988, p. 237.

Conklin, Jeff. "Hypertext: An Introduction and Survey," IEEE Computer, vol. 20, Sep. 1987, pp. 17–41 (Reference [1]).

Trigg, Randall H., "Guided Tours and Tabletops: Tools for Communicating in a Hypertext Environment, ACM Transactions on Office Information Systems", vol. 6, No. 4, Oct. 1988, pp. 398–414. (Reference [2].).

Conklin, Jeff and Begeman, M. L., "gIBIS: A Hypertext Tool for Exploratory Policy Discussion," CSCW 88 Proceedings, Sep. 1988, pp. 140–152. (Reference [3].).

(List continued on next page.)

Primary Examiner—Kee M. Tung
Assistant Examiner—U. Chauhan
Attorney, Agent, or Firm—Finnegan, Henderson, Farabow, Garrett & Dunner, L.L.P.

[57] ABSTRACT

A display request for displaying a virtual plane from an input section is interpreted by an input request processing section and sent to a display request processing section. This section searches the concerned node from node data stored in a node/link data storage section and displays such a node on a display section. Simultaneously therewith, the display request processing section sends link data included in the displayed node to the input request processing section for storage. Further, the input request processing section makes a reference of a relevant node display request from the input section to the stored link data by the input request processing section, and a link ID that identifies the concerned link is sent to a relevant node search processing section. This section searches link data within the node/link data storage section to find an ID of a relevant node and searches the node data from the ID and finds a display position on the virtual plane to display the relevant node. The currently displayed position and a display position to be displayed next for displaying the relevant node are sent to a gradual display request preparing section. This section prepares a display request based on gradual display preparing rules and sends the prepared display request to the display request processing section. This section searches the concerned node data within the node link data storage section in accordance with the display request and displays the searched node data on the display section.

8 Claims, 26 Drawing Sheets

OTHER PUBLICATIONS

Utting, Kenneth and Yankelovich, Nicole, "Context and Orientation in Hypermedia Networks," ACM Transactions on Office Information Systems, vol. 7, No. 1, Jan. 1989, pp. 58–84. (Reference [4].).

Goodman, D., "The Complete HyperCard Handbook," New York: Bantam Book, 1987. (Reference [5].).

Goodman, D., "The Complete HyperCard," Translated by Project House, 2 vols., B.N.N., 1988 (Translation of reference [5] into Japanese). (Reference [6].).

FIG. 4

| NODE ID | UPPER LEFT COORDINATES | LOWER RIGHT COORDINATES | CONTENTS OF NODE | LINK ID INCLUDED IN NODE |
|---|---|---|---|---|
| 1 | [566, 543] | [777, 756] | ¥66·····**&¢ | 2, 879, 760··· |
| 2 | [223, 66] | [333, 265] | $%%¢¢WQ·····888 | 23, 8879, 1··· |
| 3 | [566, 543] | [777, 756] | &&¢%&·····***** | 9, 879, 761··· |
| ·· | ·· | ·· | ·· | ·· |
| ·· | ·· | ·· | ·· | ·· |
| 5677 | [23, 11] | [33, 13] | LI(*&*·····&((*¢Y( | 2334, 88, 1··· |
| 5678 | [1566, 1543] | [1777, 7156] | IIOUOIO·····L::L::LD | 233, 879, 401··· |
| 5679 | [54566, 5434] | [74747, 7546] | */*/7*¢*&&·····*YHUU | 323, 749, 71··· |

FIG. 5

| LINK ID | UPPER LEFT RELATIVE COORDINATES | LOWER RIGHT RELATIVE COORDINATES | DESTINATION NODE ID |
|---|---|---|---|
| 1 | [44, 3] | [74, 65] | 71 |
| 2 | [23, 66] | [33, 65] | 5677 |
| 3 | [56, 54] | [77, 56] | 9 |
| : | : | : | : |
| : | : | : | : |
| 3343 | [23, 11] | [33, 13] | 547 |
| 3345 | [16, 15] | [77, 56] | 668 |
| 3346 | [56, 54] | [747, 46] | 12 |

FIG. 8

| STEP | UPPER LEFT COORDINATES | LOWER RIGHT COORDINATES | PRESENTATION TIME INTERVAL |
|---|---|---|---|
| 1 | $[V_{src}, W_{src}]$ | $[X_{src}, Y_{src}]$ | 0.1 SEC. |
| 2 | $[V_{src}, W_{src}]$ | $[X_{src}+1*(X_{dst}-X_{src})/5, Y_{src}+1*(Y_{dst}-Y_{src})/5]$ | 0.1 SEC. |
| 3 | $[V_{src}, W_{src}]$ | $[X_{src}+2*(X_{dst}-X_{src})/5, Y_{src}+2*(Y_{dst}-Y_{src})/5]$ | 0.1 SEC. |
| 4 | $[V_{src}, W_{src}]$ | $[X_{src}+3*(X_{dst}-X_{src})/5, Y_{src}+3*(Y_{dst}-Y_{src})/5]$ | 0.1 SEC. |
| 5 | $[V_{src}, W_{src}]$ | $[X_{src}+4*(X_{dst}-X_{src})/5, Y_{src}+4*(Y_{dst}-Y_{src})/5]$ | 0.1 SEC. |
| 6 | $[V_{src}, W_{src}]$ | $[X_{dst}, Y_{dst}]$ | 0.3 SEC. |
| 7 | $[V_{src}+1*(V_{dst}-V_{src})/5, W_{src}+1*(W_{dst}-W_{src})/5]$ | $[X_{dst}, Y_{dst}]$ | 0.1 SEC. |
| 8 | $[V_{src}+2*(V_{dst}-V_{src})/5, W_{src}+2*(W_{dst}-W_{src})/5]$ | $[X_{dst}, Y_{dst}]$ | 0.1 SEC. |
| 9 | $[V_{src}+3*(V_{dst}-V_{src})/5, W_{src}+3*(W_{dst}-W_{src})/5]$ | $[X_{dst}, Y_{dst}]$ | 0.1 SEC. |
| 10 | $[V_{src}+4*(V_{dst}-V_{src})/5, W_{src}+4*(W_{dst}-W_{src})/5]$ | $[X_{dst}, Y_{dst}]$ | 0.1 SEC. |
| 11 | $[V_{dst}, W_{dst}]$ | $[X_{dst}, Y_{dst}]$ | UNTIL NEXT INPUT |

FIG. 9

| STEP | UPPER LEFT COORDINATES | LOWER RIGHT COORDINATES | PRESENTATION TIME INTERVAL |
|---|---|---|---|
| 1 | $[V_{src}, W_{src}]$ | $[X_{src}, Y_{src}]$ | 0.1 SEC. |
| 2 | $[V_{src}-1*(V_{src}/5), W_{src}-1*(W_{src}/5)]$ | $[X_{src}+1*(X_{end}-X_{src})/5, Y_{src}+1*(Y_{end}-Y_{src})/5]$ | 0.1 SEC. |
| 3 | $[V_{src}-2*(V_{src}/5), W_{src}-2*(W_{src}/5)]$ | $[X_{src}+2*(X_{end}-X_{src})/5, Y_{src}+2*(Y_{end}-Y_{src})/5]$ | 0.1 SEC. |
| 4 | $[V_{src}-3*(V_{src}/5), W_{src}-3*(W_{src}/5)]$ | $[X_{src}+3*(X_{end}-X_{src})/5, Y_{src}+3*(Y_{end}-Y_{src})/5]$ | 0.1 SEC. |
| 5 | $[V_{src}-4*(V_{src}/5), W_{src}-4*(W_{src}/5)]$ | $[X_{src}+4*(X_{end}-X_{src})/5, Y_{src}+4*(Y_{end}-Y_{src})/5]$ | 0.1 SEC. |
| 6 | $[0, 0]$ | $[X_{end}, Y_{end}]$ | 0.3 SEC. |
| 7 | $[1*(V_{dst}/5), 1*(W_{dst}/5)]$ | $[X_{dst}+4*(X_{end}-X_{dst})/5, Y_{dst}+4*(Y_{end}-Y_{dst})/5]$ | 0.1 SEC. |
| 8 | $[2*(V_{dst}/5), 2*(W_{dst}/5)]$ | $[X_{dst}+3*(X_{end}-X_{dst})/5, Y_{dst}+3*(Y_{end}-Y_{dst})/5]$ | 0.1 SEC. |
| 9 | $[3*(V_{dst}/5), 3*(W_{dst}/5)]$ | $[X_{dst}+2*(X_{end}-X_{dst})/5, Y_{dst}+2*(Y_{end}-Y_{dst})/5]$ | 0.1 SEC. |
| 10 | $[4*(V_{dst}/5), 4*(W_{dst}/5)]$ | $[X_{dst}+1*(X_{end}-X_{dst})/5, Y_{dst}+1*(Y_{end}-Y_{dst})/5]$ | 0.1 SEC. |
| 11 | $[V_{dst}, W_{dst}]$ | $[X_{dst}, Y_{dst}]$ | UNTIL NEXT INPUT |

FIG. 10

| STEP | UPPER LEFT COORDINATES | LOWER RIGHT COORDINATES | PRESENTATION TIME INTERVAL |
|---|---|---|---|
| 1 | $[V_{src}, W_{src}]$ | $[X_{src}, Y_{src}]$ | 0.1 SEC. |
| 2 | $[V_{src}+1*(V_{dst}-V_{src})/5, W_{src}+1*(W_{dst}-W_{src})/5]$ | $[X_{src}+1*(X_{dst}-X_{src})/5, Y_{src}+1*(Y_{dst}-Y_{src})/5]$ | 0.1 SEC. |
| 3 | $[V_{src}+2*(V_{dst}-V_{src})/5, W_{src}+2*(W_{dst}-W_{src})/5]$ | $[X_{src}+2*(X_{dst}-X_{src})/5, Y_{src}+2*(Y_{dst}-Y_{src})/5]$ | 0.1 SEC. |
| 4 | $[V_{src}+3*(V_{dst}-V_{src})/5, W_{src}+3*(W_{dst}-W_{src})/5]$ | $[X_{src}+3*(X_{dst}-X_{src})/5, Y_{src}+3*(Y_{dst}-Y_{src})/5]$ | 0.1 SEC. |
| 5 | $[V_{src}+4*(V_{dst}-V_{src})/5, W_{src}+4*(W_{dst}-W_{src})/5]$ | $[X_{src}+4*(X_{dst}-X_{src})/5, Y_{src}+4*(Y_{dst}-Y_{src})/5]$ | 0.1 SEC. |
| 6 | $[V_{dst}, W_{dst}]$ | $[X_{dst}, Y_{dst}]$ | UNTIL NEXT INPUT |

FIG. 11

| STEP | UPPER LEFT COORDINATES | LOWER RIGHT COORDINATES | PRESENTATION TIME INTERVAL |
|---|---|---|---|
| 1 | $[V_{src}, W_{src}]$ | $[X_{src}, Y_{src}]$ | 0.1 SEC. |
| 2 | $[V_{src}+1*(V_{dst}-V_{src})/5, W_{src}]$ | $[X_{src}+1*(X_{dst}-X_{src})/5, Y_{src}]$ | 0.1 SEC. |
| 3 | $[V_{src}+2*(V_{dst}-V_{src})/5, W_{src}]$ | $[X_{src}+2*(X_{dst}-X_{src})/5, Y_{src}]$ | 0.1 SEC. |
| 4 | $[V_{src}+3*(V_{dst}-V_{src})/5, W_{src}]$ | $[X_{src}+3*(X_{dst}-X_{src})/5, Y_{src}]$ | 0.1 SEC. |
| 5 | $[V_{src}+4*(V_{dst}-V_{src})/5, W_{src}]$ | $[X_{src}+4*(X_{dst}-X_{src})/5, Y_{src}]$ | 0.1 SEC. |
| 6 | $[V_{dst}, W_{src}]$ | $[X_{dst}, Y_{src}]$ | 0.3 SEC. |
| 7 | $[V_{dst}, W_{src}+1*(W_{dst}-W_{src})/5]$ | $[X_{dst}, Y_{src}+1*(Y_{dst}-Y_{src})/5]$ | 0.1 SEC. |
| 8 | $[V_{dst}, W_{src}+2*(W_{dst}-W_{src})/5]$ | $[X_{dst}, Y_{src}+2*(Y_{dst}-Y_{src})/5]$ | 0.1 SEC. |
| 9 | $[V_{dst}, W_{src}+3*(W_{dst}-W_{src})/5]$ | $[X_{dst}, Y_{src}+3*(Y_{dst}-Y_{src})/5]$ | 0.1 SEC. |
| 10 | $[V_{dst}, W_{src}+4*(W_{dst}-W_{src})/5]$ | $[X_{dst}, Y_{src}+4*(Y_{dst}-Y_{src})/5]$ | 0.1 SEC. |
| 11 | $[V_{dst}, W_{dst}]$ | $[X_{dst}, Y_{dst}]$ | UNTIL NEXT INPUT |

FIG. 17(a)

OUR NEW MODEL HAS
    FOLLOWING ADVANTAGES:

1) Higiher Speed
2) Better Economy
3) More Safety
4) Lower Price

Comparison

| | Speed | Economy | Safety | Prise |
|---|---|---|---|---|
| Ours | 120 | 12 | 0.4 | 198 |
| A | 110 | 6 | 0.3 | 268 |
| B | 45 | 5 | 0.2 | 218 |

| STEP | UPPER LEFT COORDINATES | LOWER RIGHT COORDINATES | PRESENTATION TIME INTERVAL |
|---|---|---|---|
| 1 | $[V_{src}, W_{src}]$ | $[X_{src}, Y_{src}]$ | 0.1 SEC. |
| 2 | $[V_{src}, W_{src}]$ | $[X_{src}+1*(X_{dst}-X_{src})/5, Y_{src}+1*(Y_{dst}-Y_{src})/5]$ | 0.1 SEC. |
| 3 | $[V_{src}, W_{src}]$ | $[X_{src}+2*(X_{dst}-X_{src})/5, Y_{src}+2*(Y_{dst}-Y_{src})/5]$ | 0.1 SEC. |
| 4 | $[V_{src}, W_{src}]$ | $[X_{src}+3*(X_{dst}-X_{src})/5, Y_{src}+3*(Y_{dst}-Y_{src})/5]$ | 0.1 SEC. |
| 5 | $[V_{src}, W_{src}]$ | $[X_{src}+4*(X_{dst}-X_{src})/5, Y_{src}+4*(Y_{dst}-Y_{src})/5]$ | 0.1 SEC. |
| 6 | $[V_{src}, W_{src}]$ | $[X_{dst}, Y_{dst}]$ | CANCEL INTERROGATION |
| 7 | $[V_{src}+1*(V_{dst}-V_{src})/5, W_{src}+1*(W_{dst}-W_{src})/5]$ | $[X_{dst}, Y_{dst}]$ | 0.1 SEC. |
| 8 | $[V_{src}+2*(V_{dst}-V_{src})/5, W_{src}+2*(W_{dst}-W_{src})/5]$ | $[X_{dst}, Y_{dst}]$ | 0.1 SEC. |
| 9 | $[V_{src}+3*(V_{dst}-V_{src})/5, W_{src}+3*(W_{dst}-W_{src})/5]$ | $[X_{dst}, Y_{dst}]$ | 0.1 SEC. |
| 10 | $[V_{src}+4*(V_{dst}-V_{src})/5, W_{src}+4*(W_{dst}-W_{src})/5]$ | $[X_{dst}, Y_{dst}]$ | 0.1 SEC. |
| 11 | $[V_{dst}, W_{dst}]$ | $[X_{dst}, Y_{dst}]$ | UNTIL NEXT INPUT |

DATA PRESENTING DEVICE

This application is a continuation of application Ser. No. 08/149,825 filed Nov. 10, 1993, now abandoned.

BACKGROUND OF THE INVENTION

The invention relates to a data presenting device used for checking a group of data by describing such a group of data in the form of nodes and assigning such nodes on a virtual plane or for checking a relationship between the nodes by expressing the nodes by a link.

Known techniques of this type include: a browser technique in hypertext such as NoteCards (References [1], [2]), gIBIS (References [1], [3]), and Intermedia (References [1], [4]); and a relational expression technique such as HyperCard (References [5], [6]), the relational expression technique being characterized as changing a display so that a user can recognize the positional relationship when a relevant node in hypertext is presented.

Reference [1]: Conklin, Jeff, "Hypertext: An Introduction and Survey," IEEE Computer, Vol. 20, September 1987, pp. 17–41.

Reference [2]: Trigg, Randall H., "Guided Tours and Tabletops: Tools for Communicating in a Hypertext Environment," ACM Transactions on Office Information Systems, Vol. 6, No. 4, October 1988, pp. 398–414.

Reference [3]: Conklin, Jeff and Begeman, M. L., "gIBIS: A Hypertext Tool for Exploratory Policy Discussion," CSCW 88 Proceedings, September 1988, pp. 140–152.

Reference [4]: Utting, Kenneth and Yankelovich, Nicole, "Context and Orientation in Hypermedia Networks," ACM Transactions on Office Information Systems, Vol. 7, No. 1, January 1989, pp. 58–84.

Reference [5]: Goodman, D., The Complete HyperCard Handbook, New York: Bantam Book, 1987.

Reference [6]: Goodman, D., "The HyperCard," Translated by Project House, 2 vols., B.N.N., 1988 (Translation of reference [5] into Japanese).

The conventional techniques will be described.

In the browser technique in hypertext such as NoteCards, gIBIS and Intermedia, an icon for identifying the name and kind of a node is assigned to a predetermined position on a window called a browser window (a position on a virtual plane). By selecting such a node on the browser, the content of the node can be seen or contents relevant to that node can be displayed. As a result, the user can supervise nodes by assigning them at positions on a plane, which contributes to facilitating data management. In the relational expression technique in hypertext such as HyperCard, a relevant node can be displayed by shifting the display of a currently displayed node vertically and horizontally when the relevant node is presented. As a result, the user can get the feeling that the relevant node is assigned to a predetermined position with respect to the currently displayed node, which likewise contributes to facilitating data management.

However, while virtual positions are assigned on a browser in the browser technique in hypertext, it is a different window or a newly opened window that displays a node. As a result, the user must obtain relevant node data while keeping the virtual positions in mind at all times. This means that the user must obtain data while always keeping in mind both the content of the node displayed in the window and the position data displayed on the browser, which prevents simple data handling.

The relational expression technique in hypertext is effective as the data managing means as long as all the nodes can be assigned within a relatively narrow range (e.g., upper/lower and right/left with respect to the nodes). This technique is not, however, advantageous in handling a large quantity of nodes.

SUMMARY OF THE INVENTION

An object of the invention is to display a relevant node in easily acceptable form without causing a user to meticulously relate the data described in a node to the position data on a virtual plane assigned to that node when a number of nodes are distributed over the wide virtual plane.

Another object of the invention is to display an original node in easily acceptable form without causing the user to meticulously relate the data described in the original node to the position data on a virtual plane assigned to the original node when the processing of displaying a relevant node is canceled so that the initial screen can be displayed.

To achieve the above objects, the invention provides a data presenting device including input means for receiving a virtual plane display request and a relevant node display request from a user, input request processing means for interpreting the user's requests and transmitting the requests to other means, relevant node search processing means for searching a relevant node, gradual display request preparing rule storage means for storing gradual display request preparing rules, gradual display request preparing means for preparing a request for gradually displaying the relevant node based on the gradual display request preparing rules, display means for actually displaying a virtual plane to the user, display request processing means for searching concerned node data in accordance with the display requests and performing processing for displaying the node data on the display means, and node/link data storage means for storing data of nodes on the virtual plane and data of relevant nodes.

Further, the invention provides a data presenting device including means for storing data on a virtual plane as a plurality of nodes and as a link between nodes, input means for receiving a display request for displaying a node relevant to a predetermined node, means for searching the node relevant to the predetermined node, display means for displaying contents of an arbitrary node and/or link data, and display processing means for controlling display of the predetermined node and the relevant node to be displayed on a display screen of the display means in response to the display request from the input means, wherein the display processing means includes a processing section for displaying the predetermined node and the relevant node on a common display screen of the display means, means for storing rules for gradually displaying the relevant node, and a processing section for controlling display of the relevant node in accordance with gradual display request rules.

BRIEF DESCRIPTION OF THE DRAWINGS

The accompanying drawings, which are incorporated in and constitute a part of this specification, illustrate an embodiment of the invention and, together with the description, serve to explain the objects, advantages and principles of the invention. In the drawings.

FIG. 4 is a table showing an example of node data to be displayed on a virtual plane;

FIG. 5 is a table showing an example of link data indicating linkage among nodes

FIG. 8 is a table showing an example of rules included in gradual display request preparing rules;

FIG. 9 is a table showing another example of rules included in gradual display request preparing rules;

FIG. 10 is a table showing still another example of rules included in gradual display request preparing rules;

FIG. 11 is a table showing further still another example of rules included in gradual display request preparing rules;

FIGS. 17(a) through 17(f) are diagrams showing an example of screens displaying a relevant node in the second embodiment;

FIG. 19 is a table showing an example of rules included in gradual display request preparing rules in the third embodiment.

DETAILED DESCRIPTION OF THE PREFERRED EMBODIMENTS

Features of the invention will now be described specifically with reference to embodiments shown in the accompanying drawings.

First Embodiment

Figure 1:
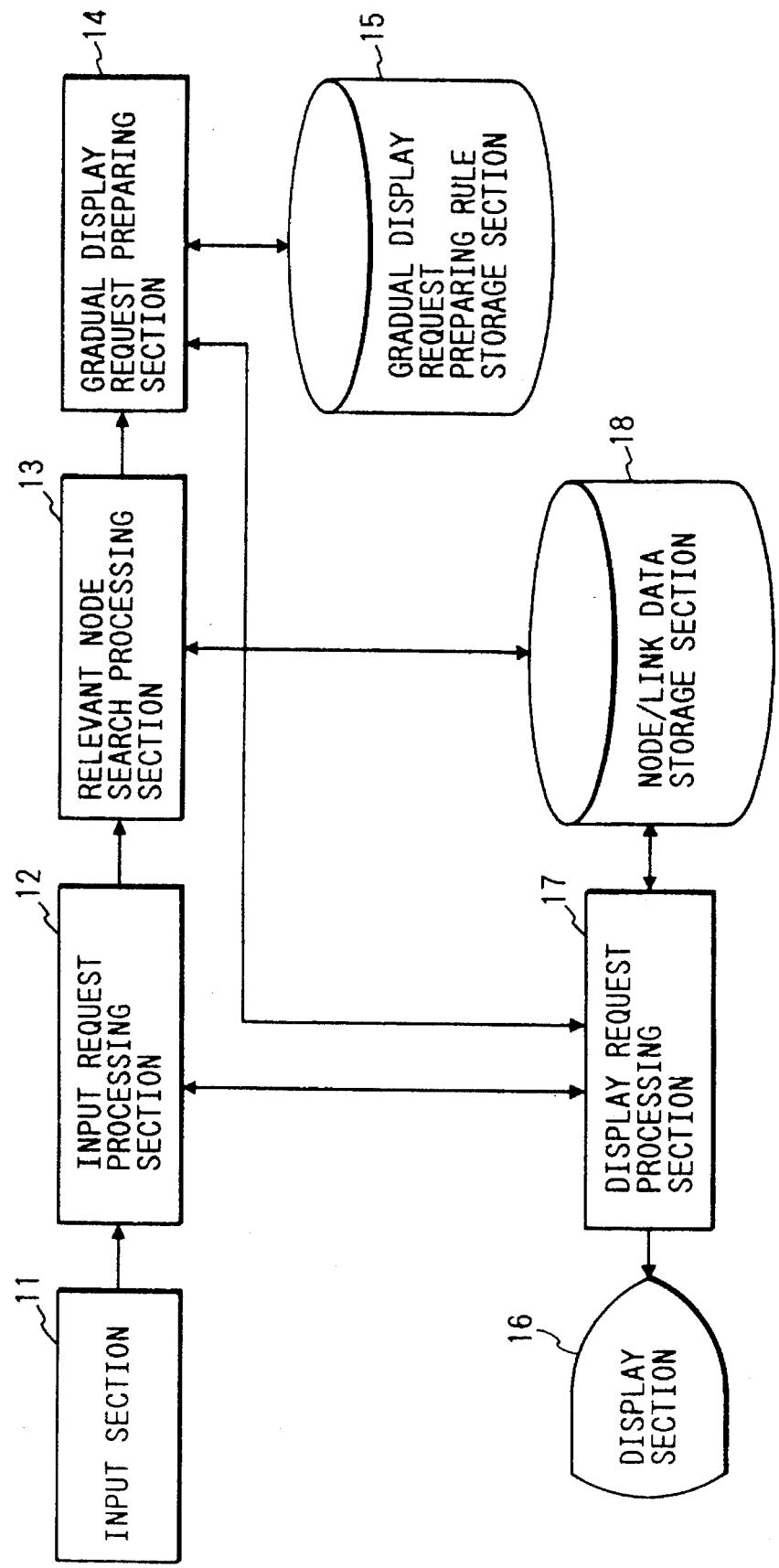
FIG. 1 is a block diagram showing an overall configuration of a data presenting device, which is a first embodiment of the invention.

FIG. 1 is a block diagram showing an overall configuration of a data presenting device, which is a first embodiment of the invention.

This device includes: an input section 11 for receiving a display request and a relevant node display request from a user; an input request processing section 12 for interpreting the user's requests and transmitting such requests to other processing sections; a relevant node search processing section 13 for searching a relevant node; a gradual display request preparing section 14 for preparing a request for gradually displaying a relevant node; a gradual display request preparing rule storage section 15 for storing rules for preparing a gradual display; a display section 16 for displaying a virtual plane to the user; a display request processing section 17 for searching node data matching the display requests and performing the processing for displaying such node data on the display section 16; and a node/link data storage section 18 for storing node data and relevant node data (link data).

First, the process of displaying an arbitrary position on a virtual plane at the request of a user will be described with reference to a flowchart shown in FIG. 3. The input section 11 receives from the user an input as to which position on the virtual plane is to be displayed (Step S3a).

The user's request is sent to the display request processing section 17 through the input request processing section 12 as a display request. The display request processing section 17 searches the concerned data out of node data stored in such formats as exemplified in FIG. 4 (Step S3b).

The display request processing section 17 prepares a display of the virtual plane and displays the virtual plane on the display section 16 (Step S3c).

At the same time, the display request processing section 17 checks a column of "link IDs included in node" to find the link IDs included in the currently displayed node, looks for link data stored in such formats as exemplified in FIG. 5 based on the result of the check, and then sends the concerned link data to the input request processing section 12 (Step S3d).

The input request processing section 12 that has received the link data keeps the received link data stored until a next display position is inputted (Step S3e).

Then, the process of viewing (or tracing the link of) a relevant node in accordance with a user's request will be described with reference to a flowchart shown in FIG. 6.

The input section 11 receives a relevant node display request from the user (Step S6a).

Figure 3:
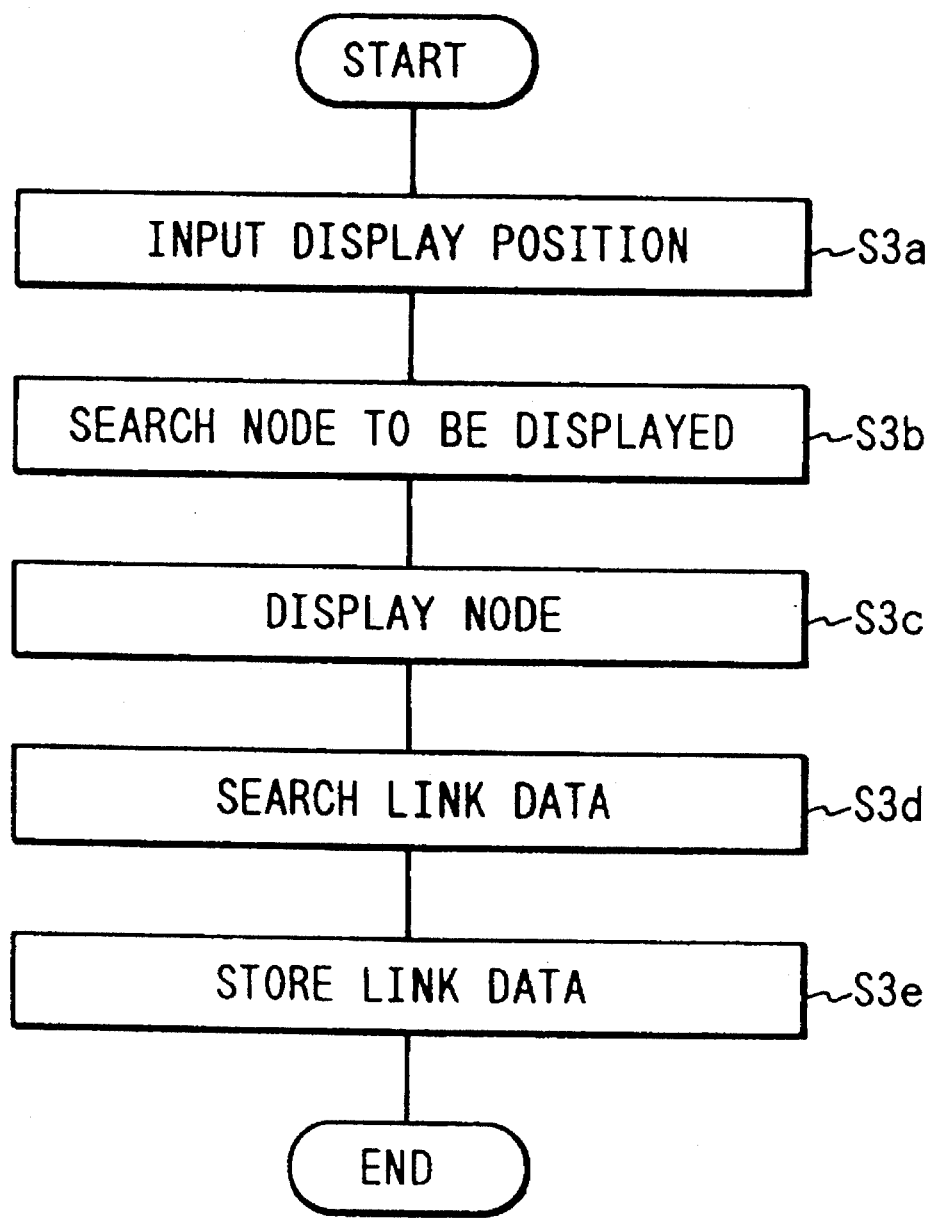
FIG. 3 is a flowchart showing processing for displaying a virtual plane at the request of a user.

The input request processing section 12 that has received the relevant node display request refers to the link data stored as a result of having been through with the virtual plane displaying process shown in FIG. 3, judges which link has been selected, obtains the ID of such a link, and sends the ID to the relevant node search processing section 13 (Step S6b).

The relevant node search processing section 13 that has received the link ID searches link data within the node/link data storage section 18 to obtain the position data of the node to be displayed. The relevant node search processing section 13 then sends to the gradual display preparing section 14 the currently displayed position and a position to be displayed next (Step S6c).

The gradual display request preparing section 14 prepares display requests in accordance with rules stored in the gradual display request preparing rule storage section 15 (Step S6d).

The display request processing section 17 that has received the display requests from the gradual display request preparing section 14 searches data in the node/link data storage section 18 and displays the display requests on a single request basis on the display section 16 (Step S6e).

This processing is repeated until the display requests run out. When the display requests have run out, the processing is ended (Step S6f).

Several methods such as described below are available to display data by a display request. At least rules for one of such methods are stored in the gradual display request preparing rule storage section 15.

(1) A data presenting method involving the steps of: gradually enlarging a data display range; gradually reducing the data display range with a node relevant to a currently presented node displayed in the middle of the screen upon presentation of the relevant node; and finally displaying the relevant node on full scale, when the relevant node is presented.

Figure 7:
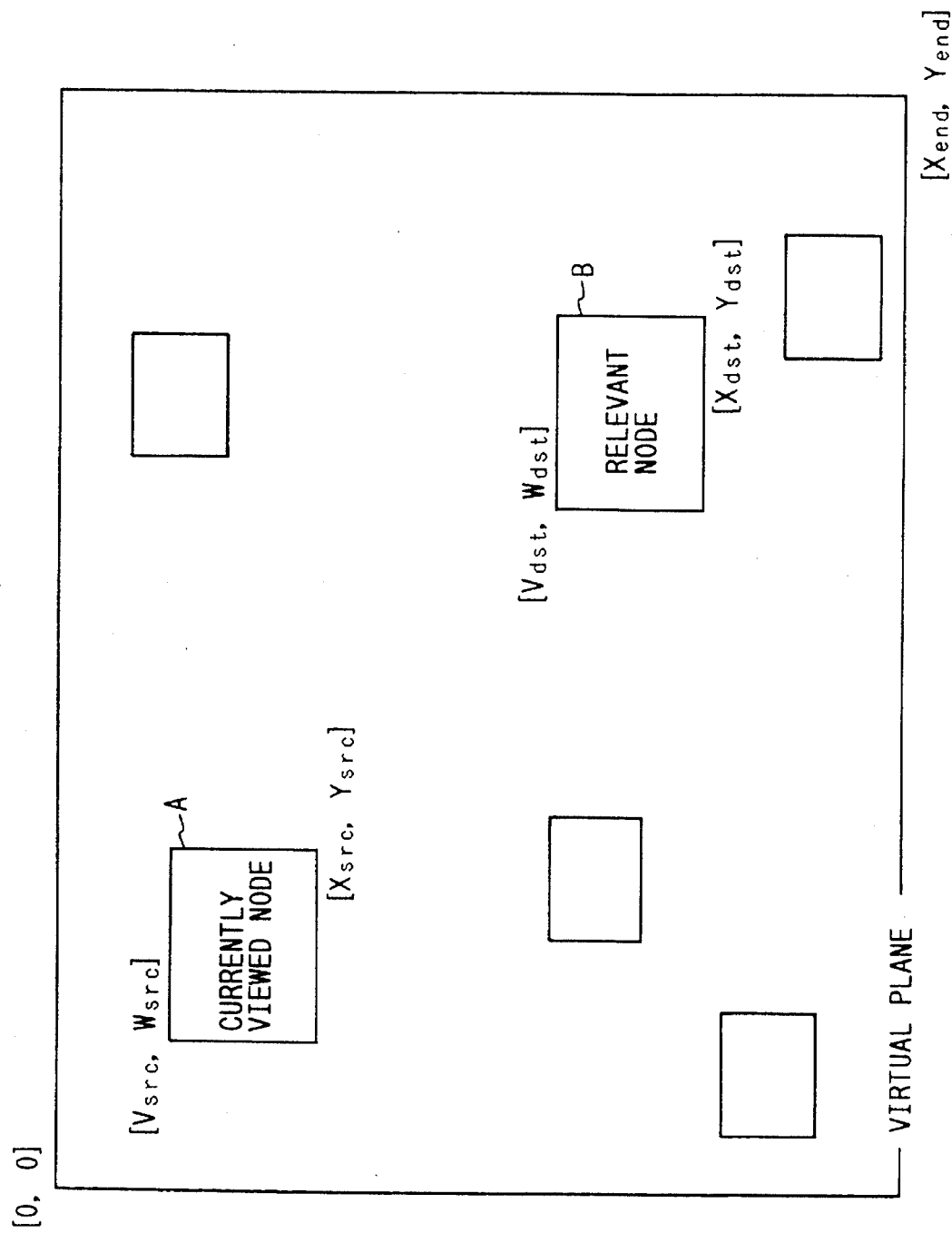
FIG. 7 is a diagram showing an example of coordinates of a currently viewed node and a relevant node on a virtual plane.
Figure 12A:
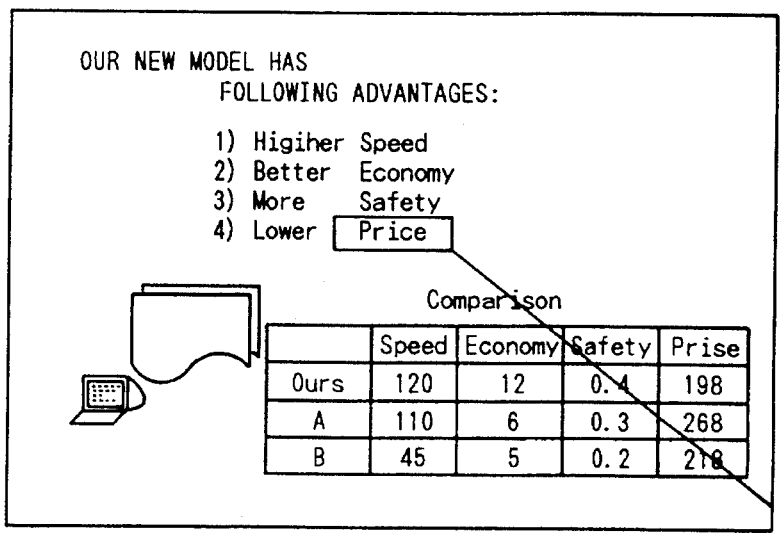
FIGS. 12(a) through 12(e) are diagrams showing an example of screens displaying a relevant node.
Figure 12B:
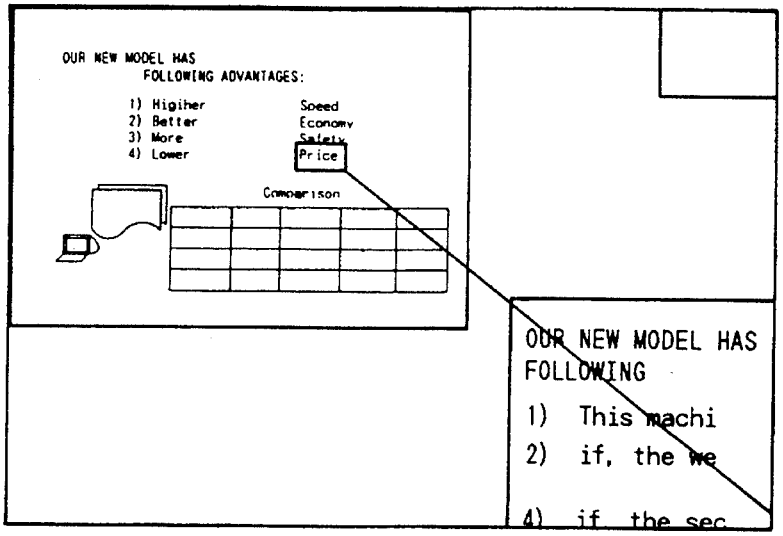
Figure 12C:
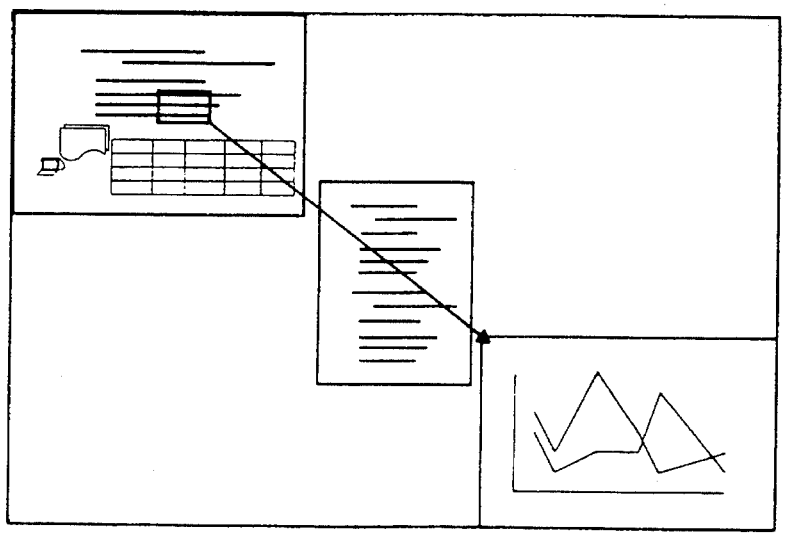
Figure 12D:
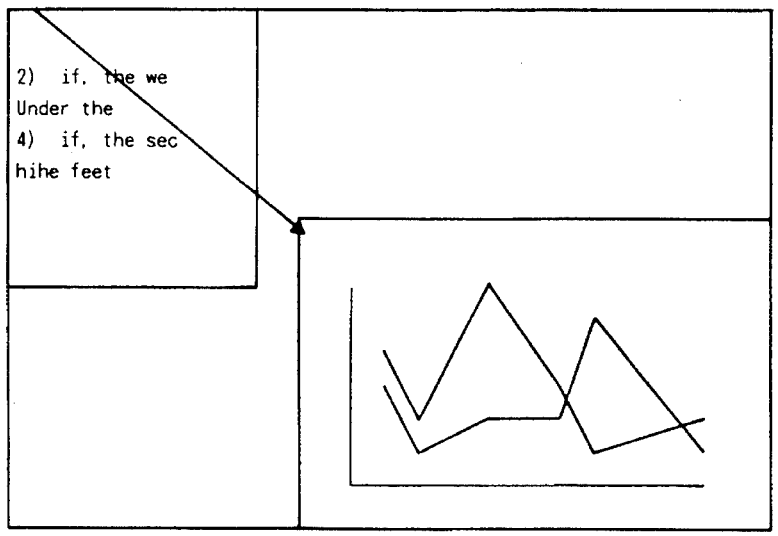
Figure 12E:
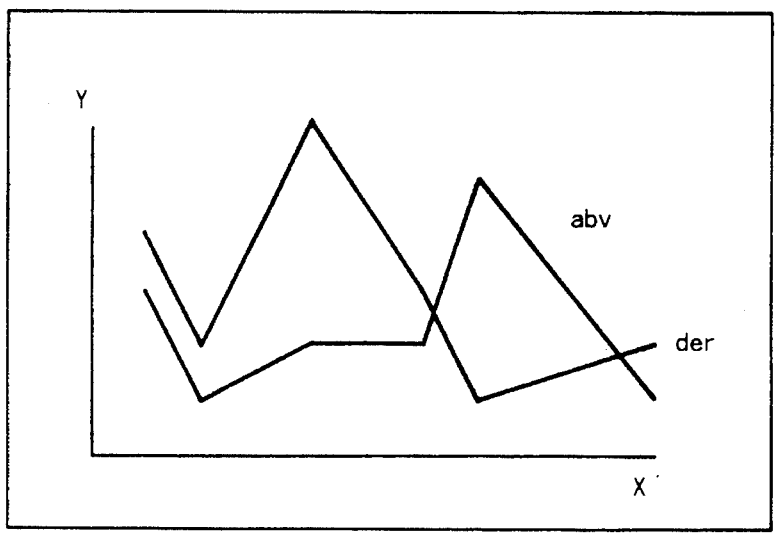
Figure 13A:
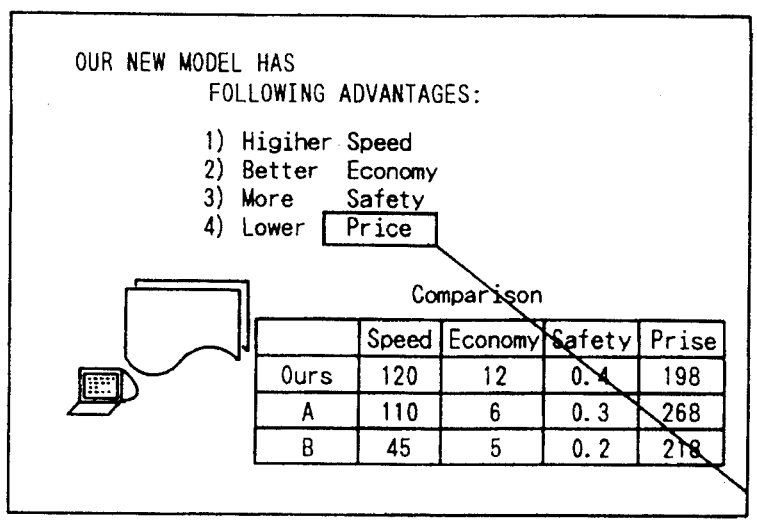
FIGS. 13(a) through 13(e) are diagrams showing another example of screens displaying a relevant node.
Figure 13B:
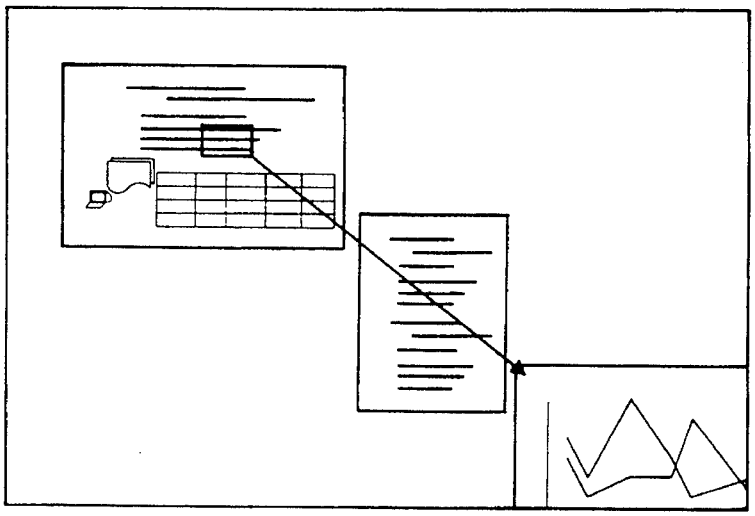
Figure 13C:
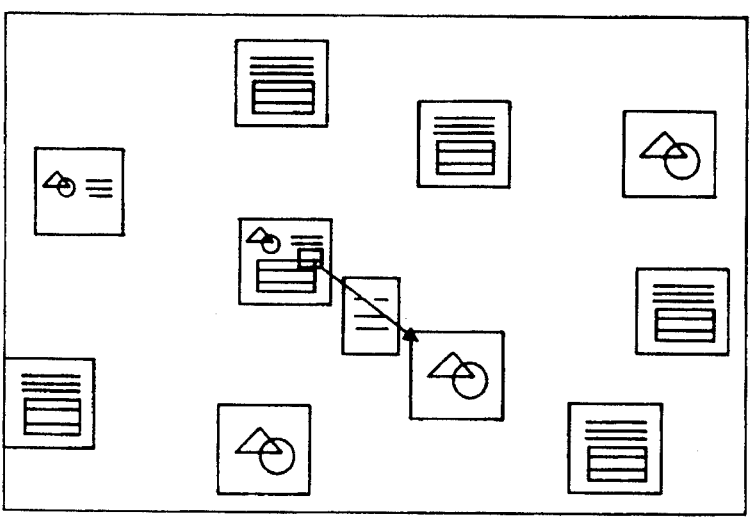
Figure 13D:
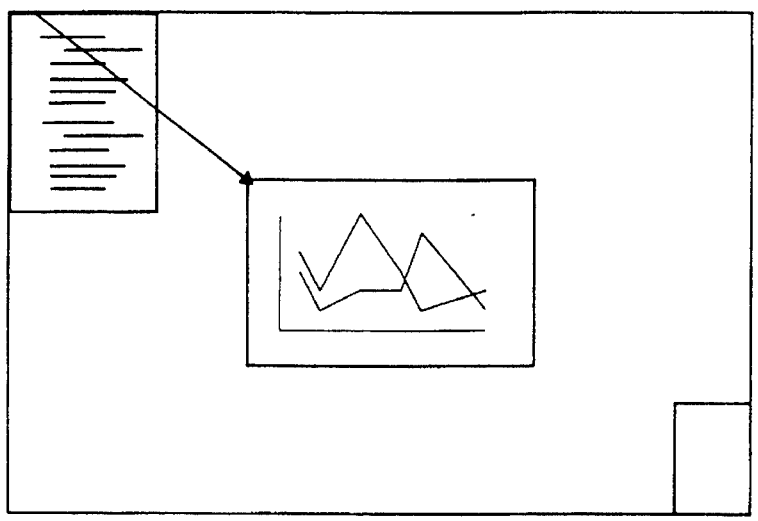
Figure 13E:
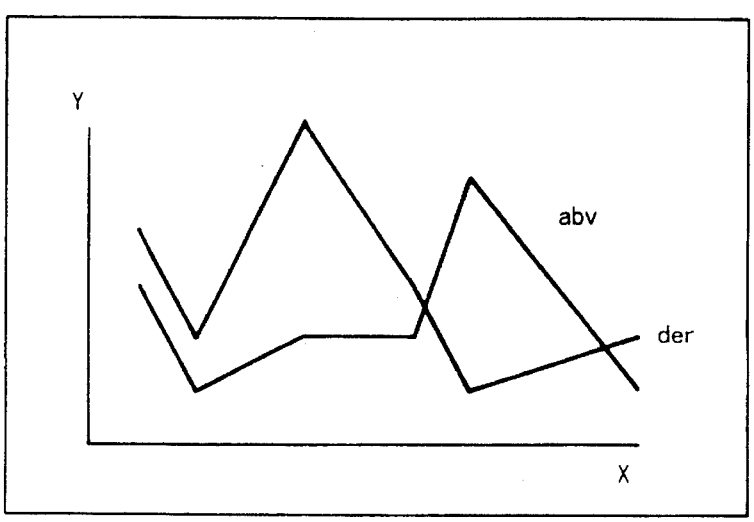
Figure 14A:
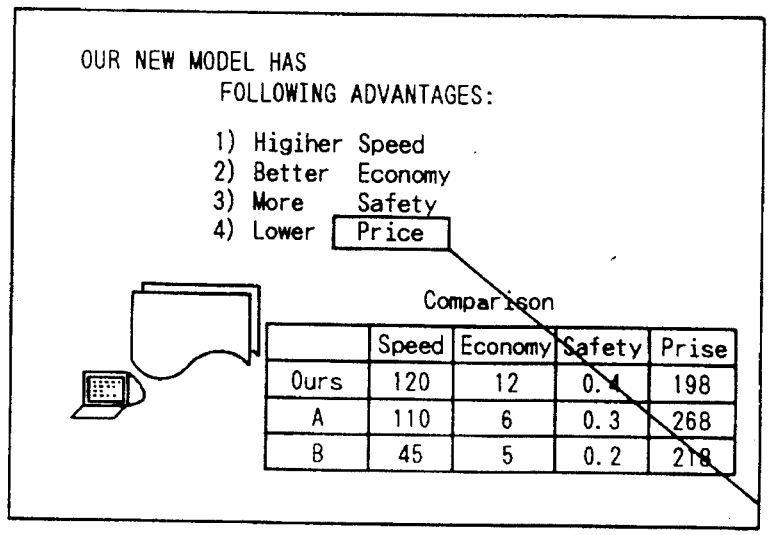
FIGS. 14(a) through 14(d) are diagrams showing still another example of screens displaying a relevant node.
Figure 14B:
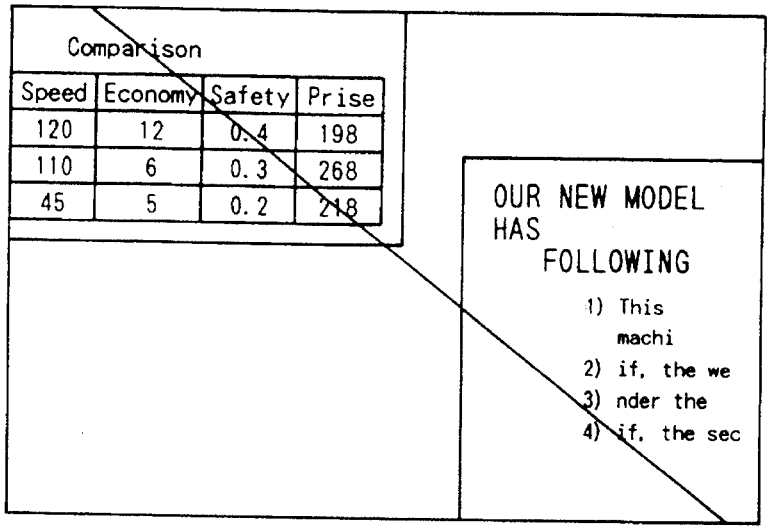
Figure 14C:
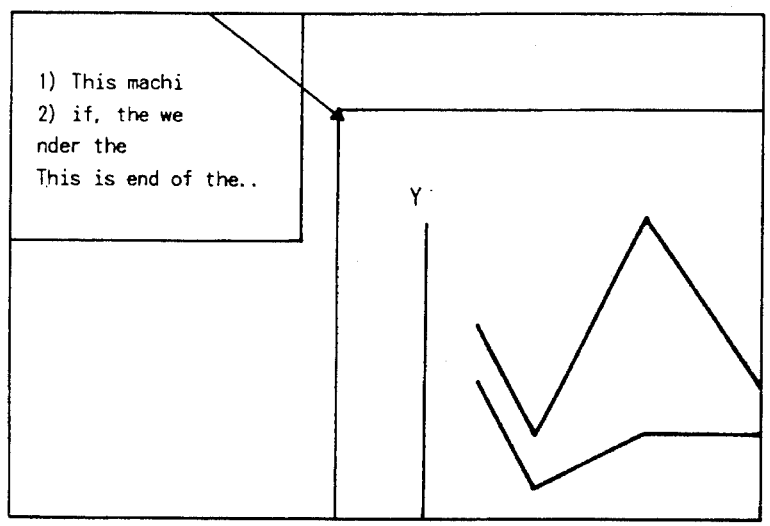
Figure 14D:
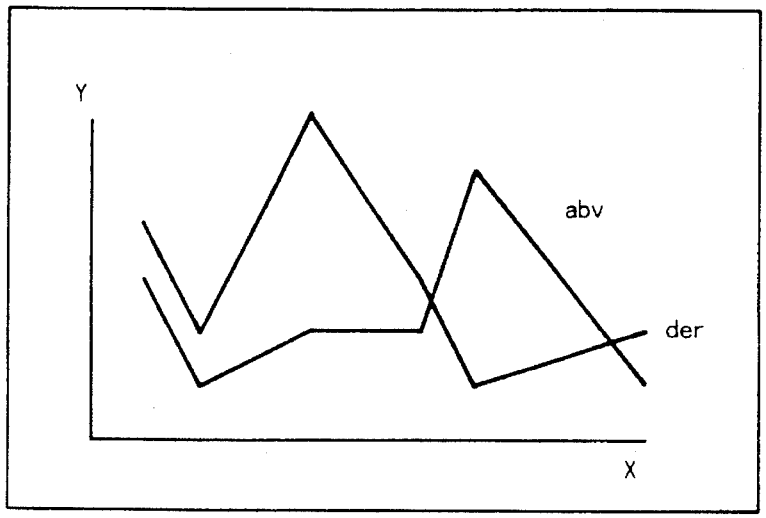
Figure 15A:
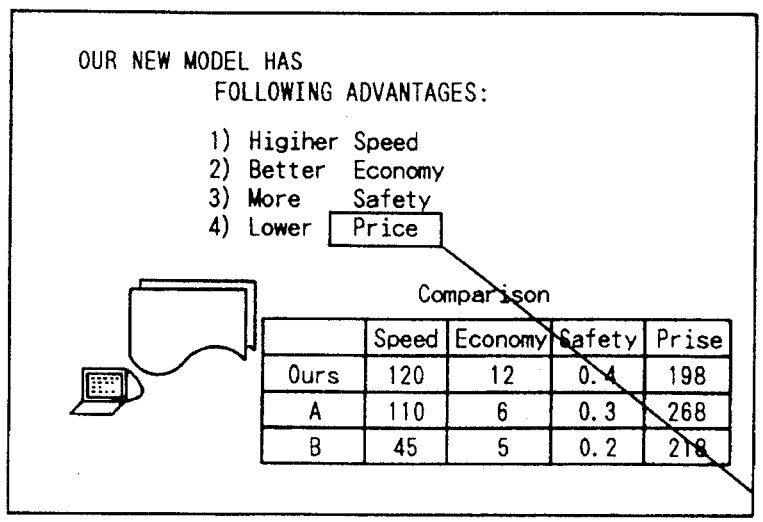
FIGS. 15(a) through 15(f) are diagrams showing further still another example of screens displaying a relevant node.
Figure 15B:
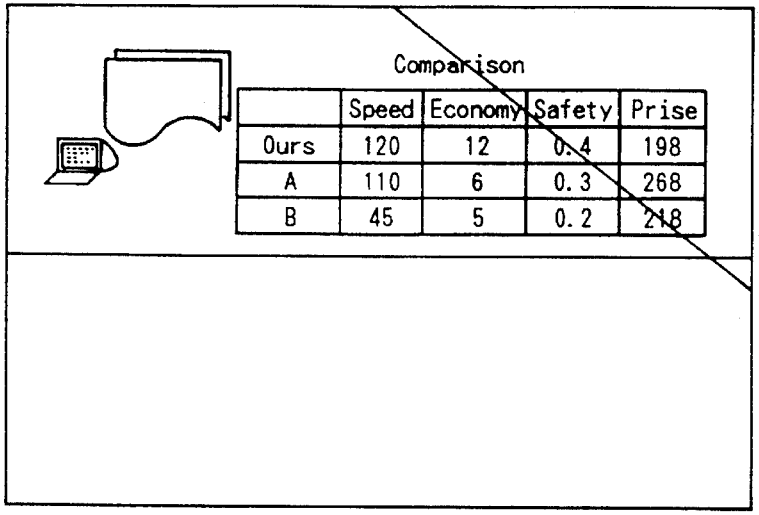
Figure 15C:
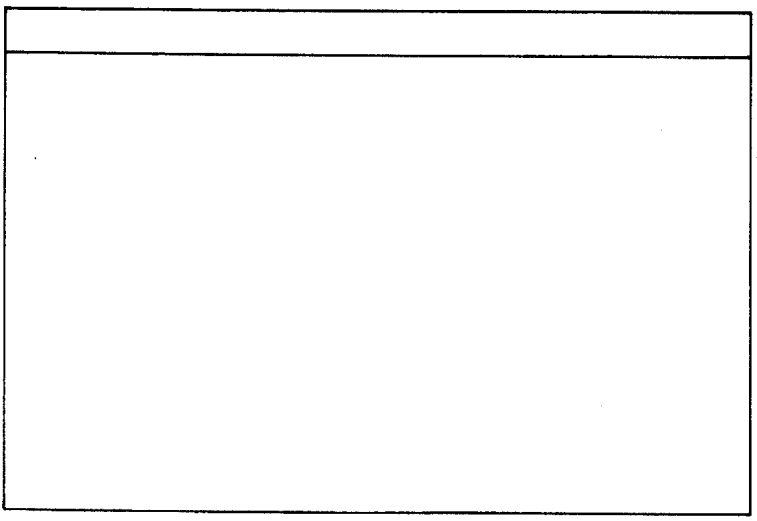
Figure 15D:
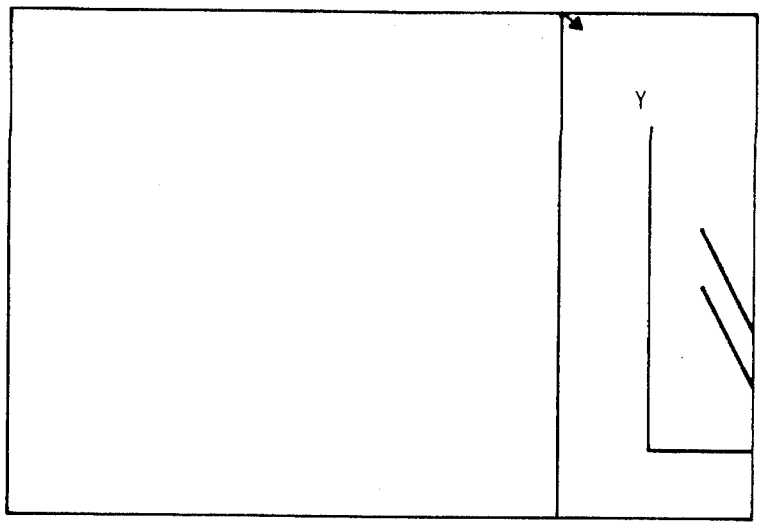
Figure 15E:
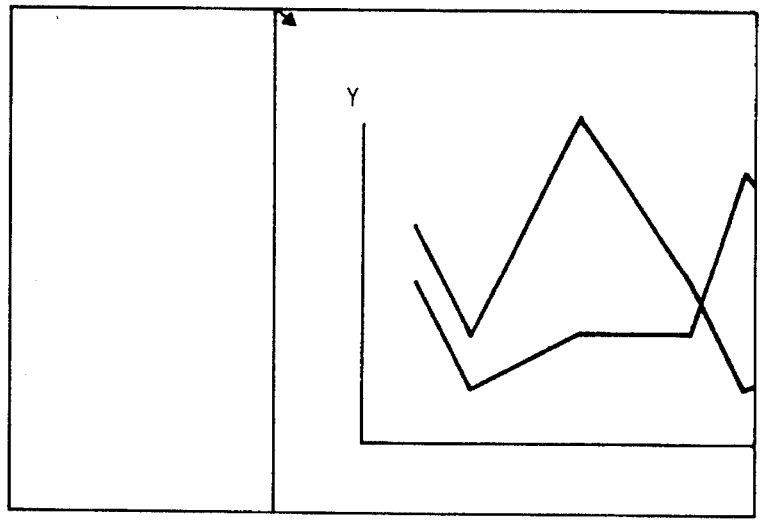
Figure 15F:
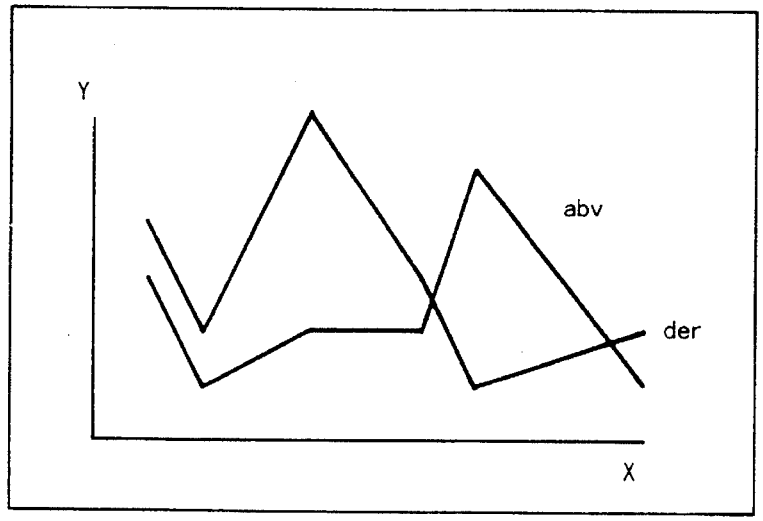

Used in this method are rules exemplified in FIG. 8, which define the range of images on the virtual plane displayed on the display section 16 and the transition in presentation time interval if the currently displayed node, the relevant node, and the coordinates of the entire virtual plane are assumed to be such as shown in FIG. 7. The rules shown in FIG. 8 are designed to gradually enlarge the range displayed on the display section 16 to such an extent as to allow a node B relevant to a currently displayed node A to be included therein when the relevant node B is displayed under an initial state in which the node A is displayed on full scale on the screen of the display section 16, and then to gradually reduce the display range so that the node B is left within the display range upon display of the node B. The rules describe the method of defining the positions of the coordinates on the virtual plane corresponding to the upper left end and the lower right end within the display range on the display section 16 based on the upper left coordinates of the node A and of the node B in function of time. In steps 1 to 6, the lower right coordinates within the display range are gradually changed with time based on the lower right coordinates $[X_{src}, Y_{src}]$ of the node A and the lower right coordinates $[X_{dst}, Y_{dst}]$ of the node B. In steps 7 to 11, the upper left coordinates within the display range are gradually changed with time based on the upper left coordinates $[V_{src}, W_{src}]$ of the node A and the upper left coordinates $[V_{dst}, W_{dst}]$ of the node B.

FIGS. 12(*a*) through 12(*e*) show a transition from one display to another according to this presenting method. FIG. 12(*a*) is a display corresponding to step 1 of FIG. 8, with the entire portion of the node A displayed on the display screen; FIG. 12(*b*) is a display corresponding to step 4 of FIG. 8; FIG. 12(*c*) is a display corresponding to step 6 of FIG. 8 with both nodes A and B displayed on the display screen; FIG. 12(*d*) is a display corresponding to step 9 of FIG. 8; and FIG. 12(*e*) is a display corresponding to step 11 of FIG. 8 with the entire portion of the node B displayed.

(2) A data presenting method involving the steps of: gradually enlarging a data display range; gradually reducing the data display range with a node relevant to a currently presented node displayed in the middle of the screen upon presentation of all the nodes on a virtual plane; and finally displaying the relevant node on full scale, when the relevant node is presented.

Used in this method are rules exemplified in FIG. 9, which define the range of images on the virtual plane displayed on the display section 16 and the transition in presentation time interval if the currently displayed node, the relevant node, and the coordinates of the entire virtual plane are assumed to be such as shown in FIG. 7. The rules shown in FIG. 9 are designed to gradually enlarge the range displayed on the display section 16 to such an extent as to allow the entire portion of the virtual plane to be displayed therein when the relevant node B is displayed under an initial state in which the node A is displayed on full scale on the screen of the display section 16, and then to gradually reduce the display range so that only the node B is left on the display range upon display of the entire portion of the virtual plane.

FIGS. 13(*a*) through 13(*e*) show a transition from one display to another according to this presenting method. FIG. 13(*a*) is a display corresponding to step 1 of FIG. 9, with the entire portion of the node A displayed on the display screen; FIG. 13(*b*) is a display corresponding to step 4 of FIG. 9; FIG. 13(*c*) is a display corresponding to step 6 of FIG. 9 with all the nodes displayed; FIG. 13(*d*) is a display corresponding to step 9 of FIG. 9; and FIG. 13(*e*) is a display corresponding to step 11 of FIG. 9 with the entire portion of the node B displayed.

(3) A data presenting method involving the steps of: displaying a straight line from a position displaying a currently presented node to such a position as to allow a node relevant to the currently presented node by gradually shifting such line; and finally displaying the relevant node on full scale, when the relevant node is presented.

This display method is designed to gradually change the display in accordance with rules exemplified in FIG. 10. The upper left end of a displayed image corresponds to a position on a straight line that connects the upper left coordinates of the node A and the upper left coordinates of the node B on a virtual plane. The lower right end of the displayed image corresponds to a position on a straight line that connects the lower right coordinates of the node A and the lower right coordinates of the node B on the virtual plane. These ends are gradually shifted in such a direction as to display the node B while maintaining their relative positions.

FIGS. 14(*a*) through 14(*d*) show a transition from one display to another according to this presenting method. The size of the display range on the virtual plane is constant in any step. The range is shifted over the virtual plane linearly until the node B is displayed.

(4) A data presenting method involving the steps of: displaying such a position as to allow a node relevant to a currently presented node by first gradually shifting the screen only in the X-axis direction from a position at which the currently presented node is displayed and then gradually shifting the screen only in the Y-axis direction (or vice versa); and finally displaying the relevant node on full scale, when the relevant node is presented.

FIG. 11 shows an example of gradual display request preparing rules to be used in this presenting method. FIGS. 15(*a*) through 15(*f*) show an example of how a relevant node is displayed by this presenting method. FIG. 15(*a*) is a display corresponding to step 1 of FIG. 11; FIG. 15(*b*) is a display corresponding to step 3 of FIG. 11; FIG. 15(*c*) is a display corresponding to step 5 of FIG. 11; FIG. 15(*d*) is a display corresponding to step 7 of FIG. 11; FIG. 15(*e*) is a display corresponding to step 9 of FIG. 11; and FIG. 15(*f*) is a display corresponding to step 11 of FIG. 11.

Second Embodiment

Figure 2:
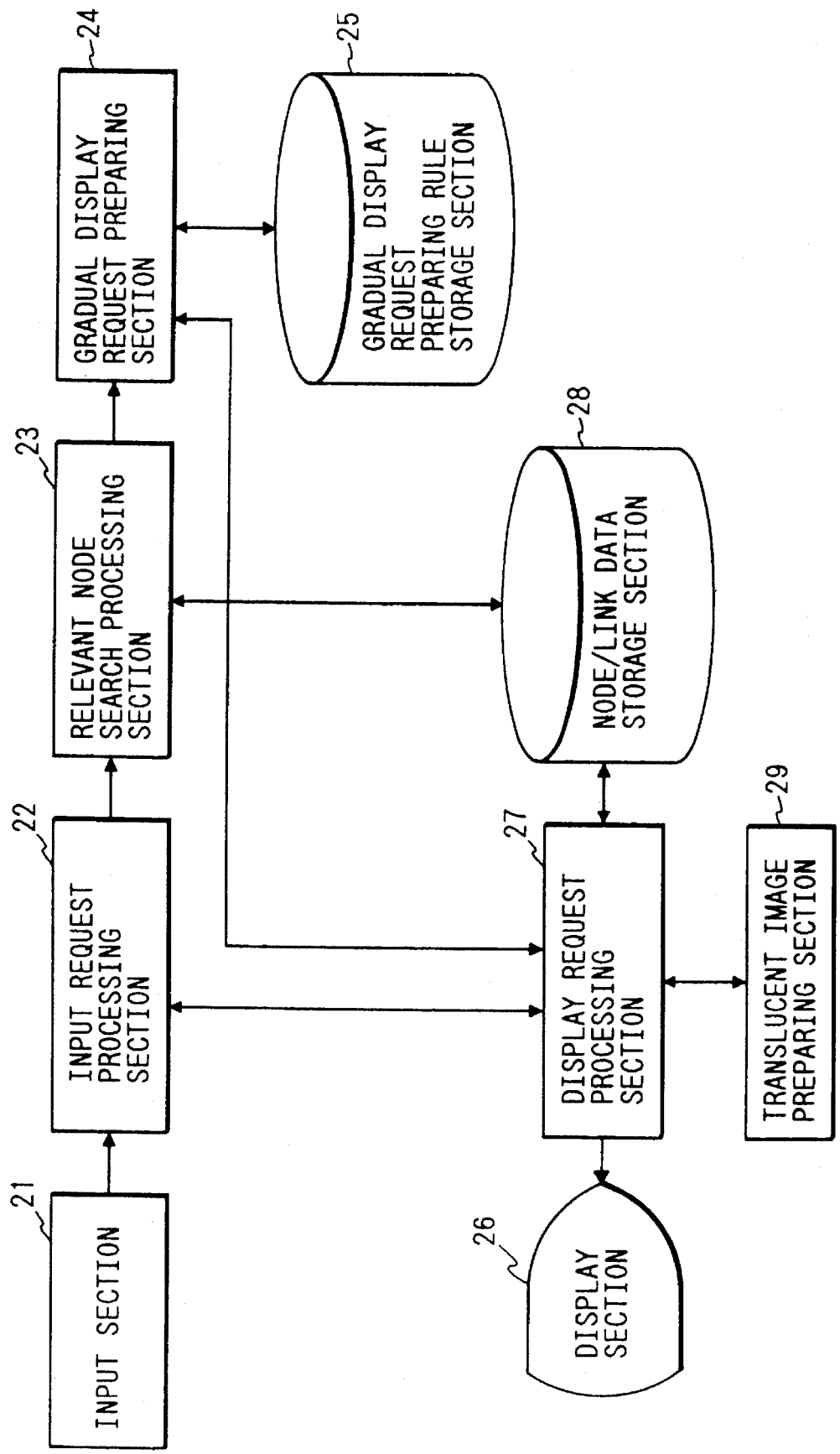
FIG. 2 is a block diagram showing an overall configuration of a data presenting device, which is a second embodiment of the invention.

FIG. 2 is a block diagram showing an overall configuration of a data presenting device, which is a second embodiment of the invention. The device, which is the second embodiment, is characterized as adding a translucent image preparing section 29 to the first embodiment shown in FIG. 1. The translucent image preparing section 29 prepares an image in which the content of a currently displayed image is made translucent.

Figure 16:
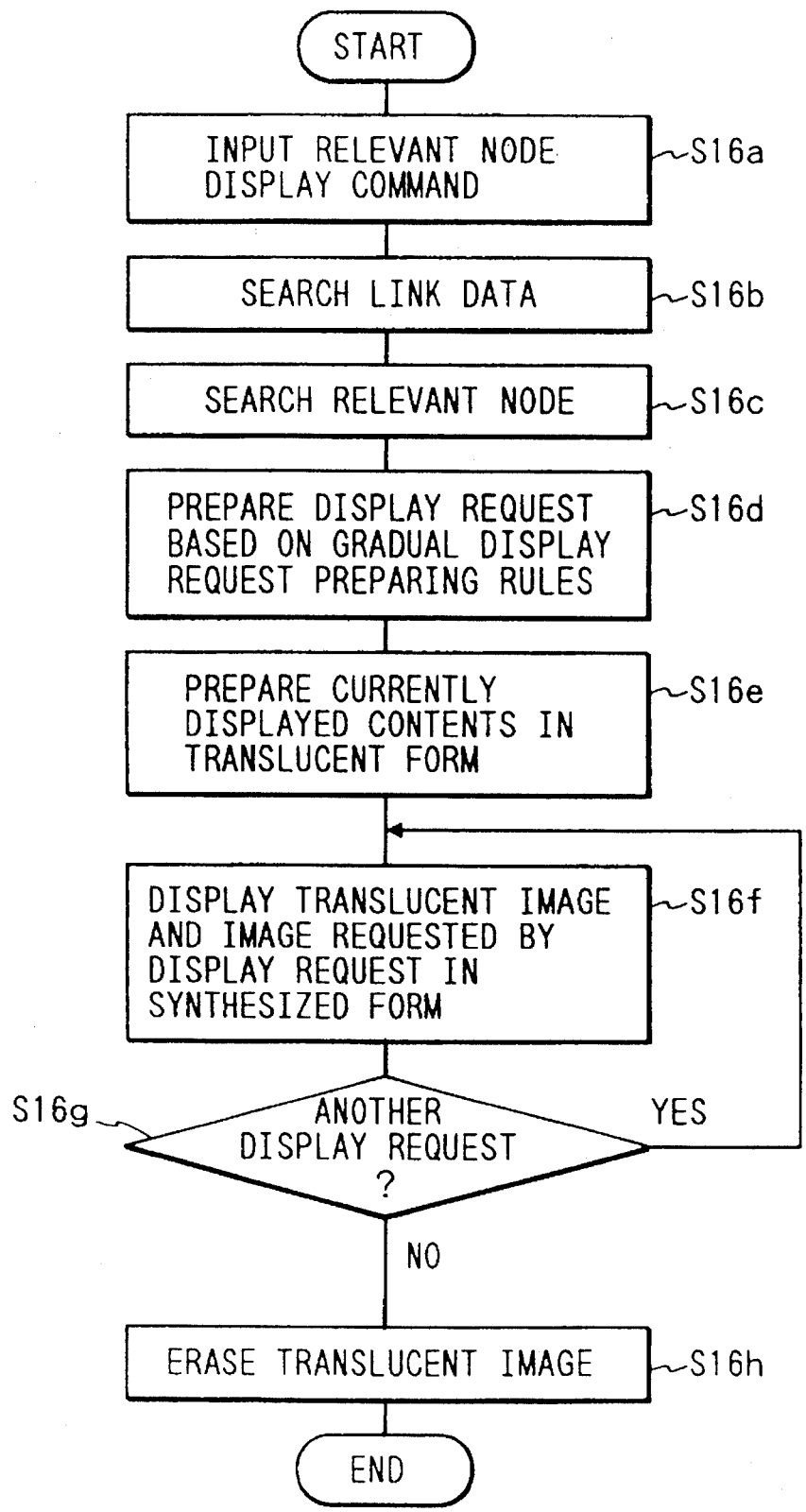
FIG. 16 is a flowchart showing processing for displaying a node (or tracing the link of a node) relevant to a currently viewed node in the second embodiment.

The process for viewing a relevant node (or tracing the link of a relevant node) in the second embodiment will be described with reference to a flowchart shown in FIG. 16.

Figure 6:
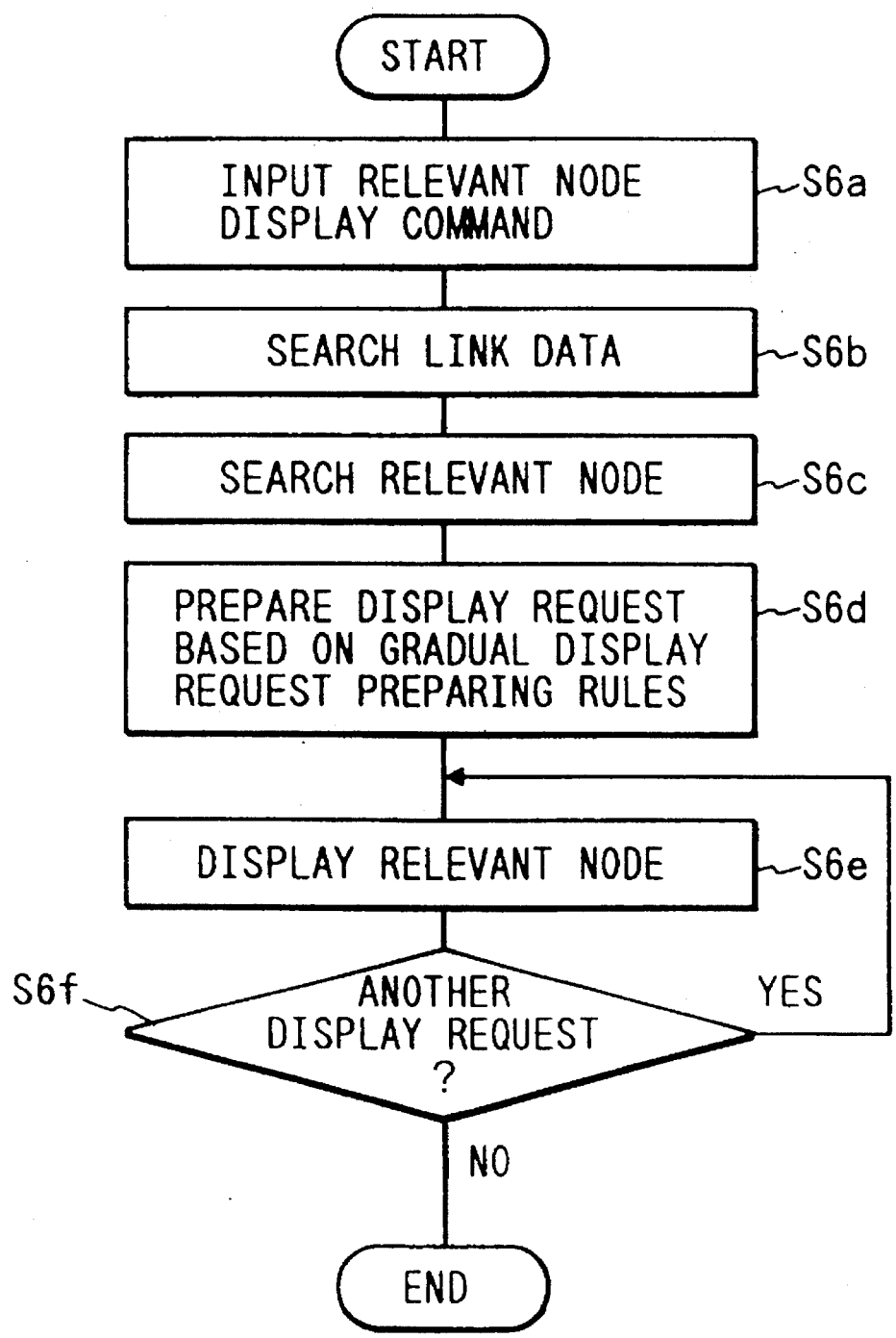
FIG. 6 is a flowchart showing processing for displaying a node (or tracing the link of a node) relevant to a currently viewed node in the first embodiment.

The process between Steps S16a and S16d is completely the same as that shown in FIG. 6.

After a display request has been prepared, a currently displayed screen is sent to the translucent image preparing section 29 to prepare an image in which the content of the currently displayed screen is made translucent (Step S16e).

A display request processing section 27 that has received the display request from a gradual display request preparing section 24 searches a node/link data storage section 28, synthesizes a relevant node with the translucent image prepared in Step S16e, and displays the synthesized image on the display section 26 (Step S16f).

This process is repeated until display requests run out (Step S16g). When all the display requests have been processed, the translucent image is erased to end the processing (Step S16h).

Figure 17D:
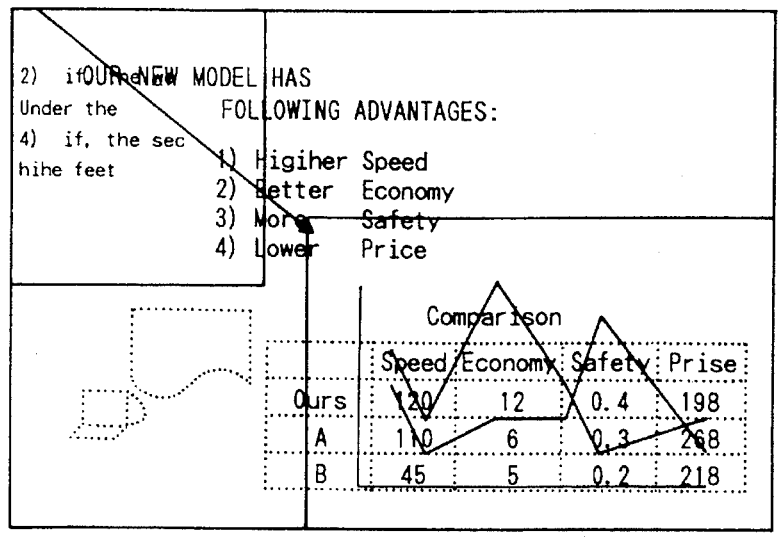
Figure 17E:
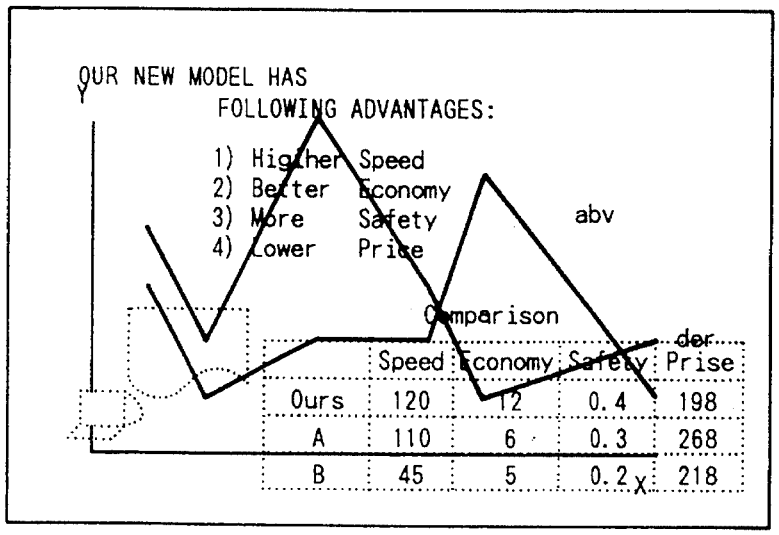
Figure 17F:
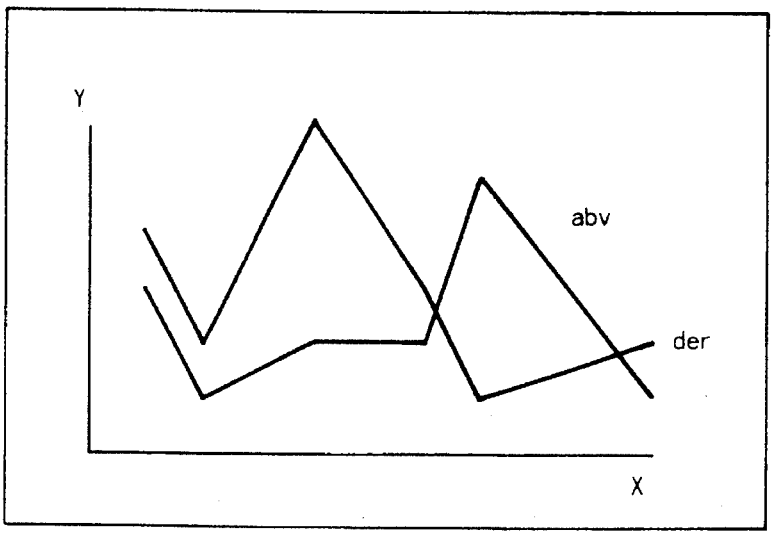

FIGS. 17(a) through 17(f) show exemplary display screens to indicate the steps of a gradual change in display according to the second embodiment. The screen in the step shown in FIG. 17(a) is displayed in translucent form throughout the steps shown in FIGS. 17(b) through 17(e).

Third Embodiment

What characterizes a third embodiment of the invention over the first and the second embodiments is that when a node relevant to a currently presented node is to be presented, the presentation of the relevant node can be interrupted by an input from a user during the process of presenting the relevant node. To implement this feature, the gradual display request preparing rules stored in the gradual display request preparing rule storage section 15 (or 25) in FIG. 1 (or FIG. 2) include a description of a cancel interrogating timing as shown in FIG. 19.

Figure 18:
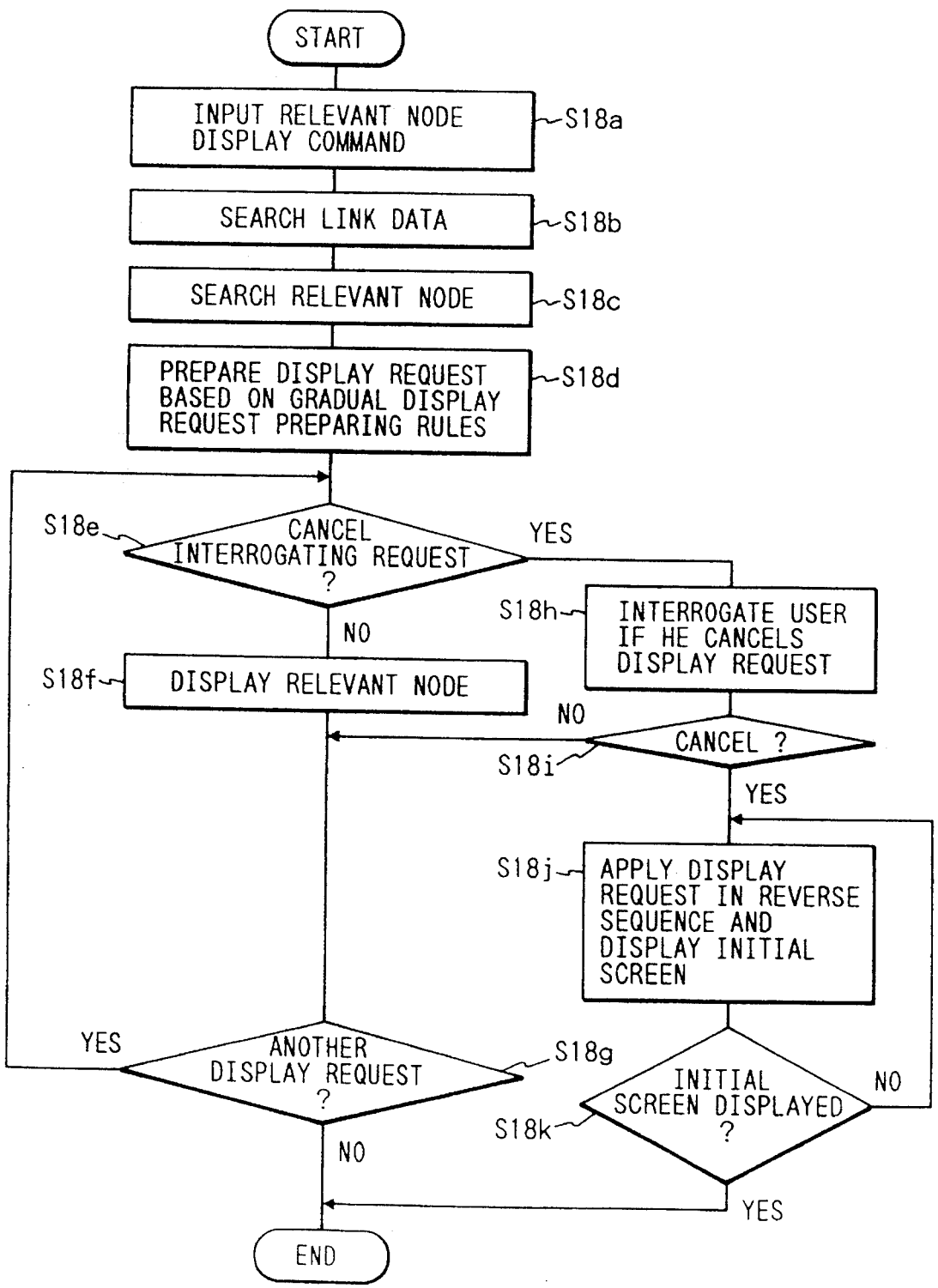
FIG. 18 is a flowchart showing processing for displaying a node (or tracing the link of a node) relevant to a currently viewed node in a third embodiment of the invention.
Figure 20A:
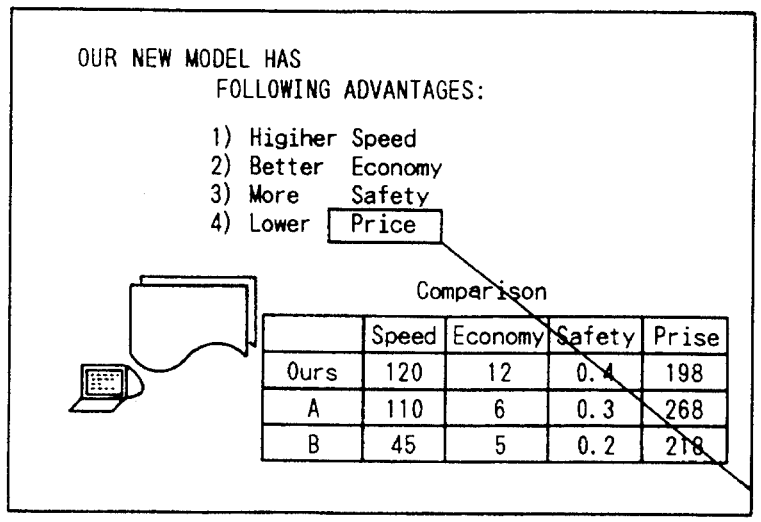
FIGS. 20(a) through 20(e) are diagrams showing an example of screens displaying a relevant node in the third embodiment.
Figure 20B:
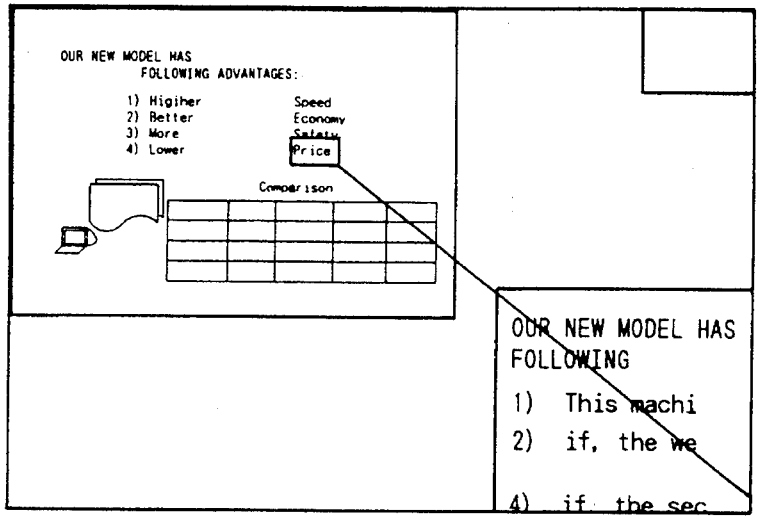
Figure 20C:
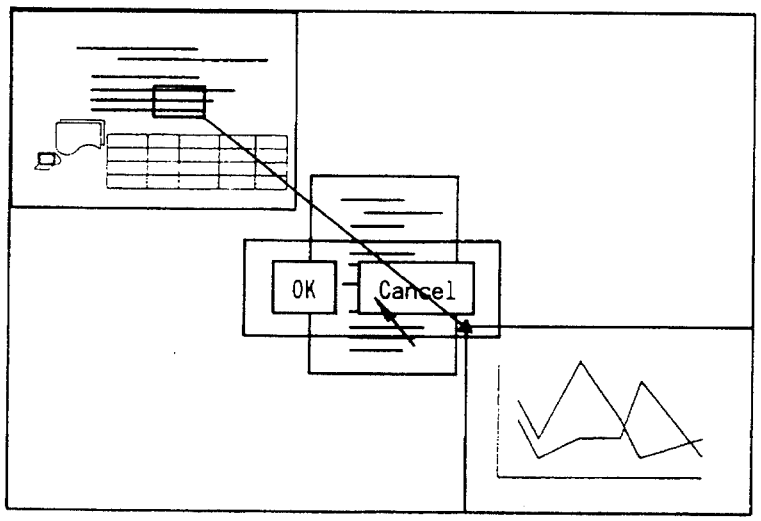
Figure 20D:
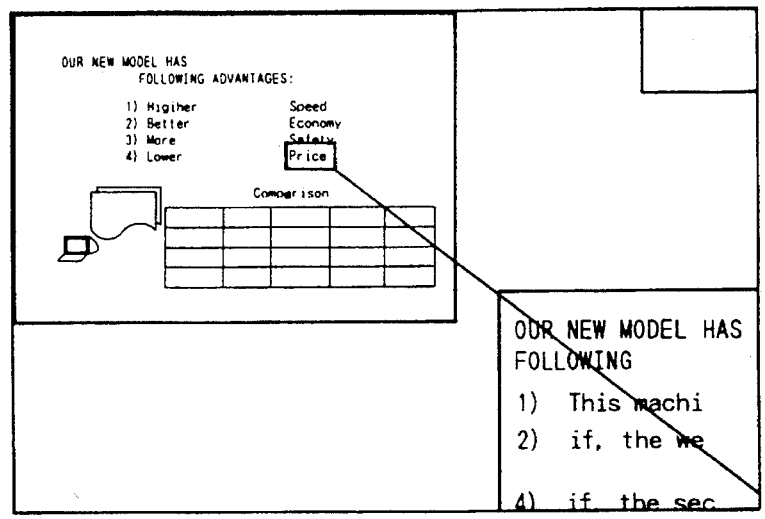
Figure 20E:
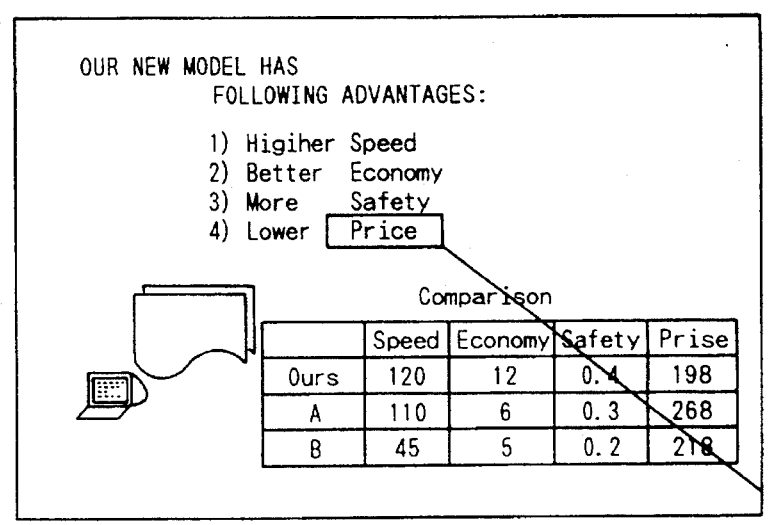

The process of viewing a relevant node (tracing the link of a relevant node) will be described with reference to a flowchart shown in FIG. 18.

The process between Steps S18a and S18d is substantially the same as that shown in FIG. 6.

Whether or not the description of a cancel interrogation is included in the gradual display request preparing rules is checked (Step S18e). If the display request is not a cancel interrogating request, the display request processing section 17 (or 27) that has received the display request searches the node/link data storage section 18 (or 28) and displays the relevant node on the display section 16 (or 26) (Step S18f).

This process is repeated until display requests run out. When all the display requests have been taken care of, the processing is ended (Step S18g).

If the display request is found to be a cancel interrogating request as a result of the judgment in Step S18e, then the user is interrogated if he cancels the processing. The user answers through the input section 11 (or 21) (Step S18h). If the user does not cancel the processing (Step S18i), the processing is continued normally. If the user cancels the processing (Step S18i), the display requests up to that moment are displayed in reverse sequence (Step S18j). Upon display of the initial screen, the processing is ended (Step S18k).

FIGS. 20(a) through 20(e) show exemplary screen displays in the third embodiment. Exemplified in these figures is a case where the user has canceled the display request in the course of the display process in response to a cancel interrogation. It is in the step shown in FIG. 20(c) that the user is interrogated if he cancels the display request.

According to the invention, a currently viewed node and a relevant node can be presented, not by newly opening a window or abruptly switching the display, but by gradually changing a screen displaying a virtual plane. Therefore, the user can check the currently viewed node and the relevant node by recognizing to which positions on the virtual plane the nodes are assigned at all times. This, freeing the user from having to carefully relate data described in the node to data on the virtual plane, contributes to facilitating the grasping of a large volume of node data/link data described on the virtual plane.

What is claimed is:

1. A data presenting device comprising:

input means for receiving a virtual plane display request and a relevant node display request from a user;

input request processing means responsive to the receipt of said requests for interpreting said requests and for transmitting said requests;

relevant node search processing means responsive to said transmitted interpreted requests for searching for node data and link data;

node data and link data storage means responsive to said relevant node search processing means for storing node data on the virtual plane and storing link data for the relevant node;

incremental original node replacement preparing means responsive to results of said relevant node search and for preparing an incremental original node replacement request for said relevant node and transmitting said incremental original node replacement request;

incremental original node replacement request preparing rule storage means for storing incremental original node replacement request preparing rules utilized by said incremental original node replacement request preparing means in preparing said incremental original node replacement request wherein the incremental original node replacement request preparing rules stored in said original node replacement request preparing rule storage means include data for which a range on the virtual plane and a time interval for displaying data on said display means are defined by a plurality of display steps, and the incremental original node replacement request preparing rules define the display range on the virtual plane and the display time interval on a step basis so that when a node relevant to a currently presented node is to be presented, a position such as to allow the relevant node to be presented is displayed by incrementally moving the currently presented node in both an X-axis direction and in a Y-axis direction off of the virtual plane while simultaneously incrementally moving the relevant node onto the virtual plane so that the relevant node is finally displayed on the virtual plane in full scale, thereby replacing the original node and allowing the user to maintain a sense of orientation;

display request processing means responsive to said incremental original node replacement requests and for searching concerned node data in accordance with said incremental original node replacement requests and performing processing for displaying said relevant node data; and display means responsive to said display request processing means for displaying said incremental original node replacement requests on a virtual plane to the user.

2. The data presenting device according to claim 1, wherein the incremental original node replacement request preparing rules define the display range on the virtual plane and the display time interval on a step basis so that when a node relevant to a currently presented node is to be presented, a data display range is incrementally enlarged over time until the relevant node is presented, the data display range is incrementally reduced so that the relevant node is displayed in the middle of the virtual plane upon presentation of the relevant node, and the relevant node is finally displayed on full scale.

3. The data presenting device according to claim 1, wherein the incremental original node replacement request preparing rules define the display range on the virtual plane and the display time interval on a step basis so that when a node relevant to a currently presented node is to be presented, a data display range is incrementally enlarged over time until all nodes on a virtual plane are presented, the data display range is incrementally reduced over time so that the relevant node is displayed in the middle of the virtual plane upon presentation of all the nodes, and the relevant node is finally displayed on full scale.

4. The data presenting device according to claim 1, wherein the incremental original node replacement request preparing rules define the display range on the virtual plane and the display time interval by the respective steps so that when a node relevant to a currently presented node is to be presented, a straight line is displayed while incrementally shifted over time from a position at which the currently presented node is displayed to such a position as to allow the relevant node to be presented, and the relevant node is finally displayed on full scale.

5. The data presenting device according to claim 1, further comprising a translucent image preparing means responsive to said display requests prepared by said display request processing means for preparing a translucent image which is superimposed over said incremental original node replacement requests on said virtual plane displayed to the user thereby allowing a user to view both the translucent image and the original node replacement requests simultaneously.

6. The data presenting device according to claim 1, wherein the incremental original node replacement request preparing rules include data for interrogating if the user interrupts a display request so that when a node relevant to a currently presented node is to be presented, processing for displaying the relevant node can be interrupted by an input from the user during the process of displaying the relevant node.

7. A data presenting device comprising:
   means for storing data on a virtual plane as a plurality of nodes and as a link between nodes;
   input means for receiving a display request for displaying a node relevant to a predetermined node;
   means for searching the node relevant to the predetermined node;
   display means for displaying contents of an arbitrary node and/or link data; and
   display processing means for controlling display of the predetermined node and the relevant node to be displayed on a display screen of said display means in response to the display request from said input means,
   wherein said display processing means comprises: a processing section for displaying the predetermined node and the relevant node on a common display screen of said display means; means for storing rules for incrementally replacing the predetermined node with the relevant node; and a processing section for controlling display of the relevant node in accordance with incremental display request rules wherein said display processing means controls said display means so that the predetermined node and the relevant node as well as linkage between the predetermined node and the relevant node are displayed on the common display screen of said display means and so that a display of the predetermined node can be changed to a display of the relevant node on the common display screen of said display means by incrementally moving the currently presented node in an X-axis direction and in a Y-axis direction off of the common display screen while simultaneously incrementally moving the relevant node onto the common display screen so as to afford the user a sense of orientation.

8. The data presenting device according to claim 7, wherein when the display of the relevant node incrementally replaces the display of the predetermined node over time on the common display screen of said display means, said display processing means finally displays only the relevant node on the common display screen of said display means.

* * * * *